(12) United States Patent
Niemeijer et al.

(10) Patent No.: US 10,972,805 B2
(45) Date of Patent: Apr. 6, 2021

(54) TARGETING TELEVISION ADVERTISEMENTS BASED ON AUTOMATIC OPTIMIZATION OF DEMOGRAPHIC INFORMATION

(75) Inventors: Gerrit Niemeijer, Maplewood, NJ (US); Seth Haberman, New York, NY (US)

(73) Assignee: VISIBLE WORLD, LLC, Philadelphia, PA (US)

(*) Notice: Subject to any disclaimer, the term of this patent is extended or adjusted under 35 U.S.C. 154(b) by 30 days.

(21) Appl. No.: 12/793,187

(22) Filed: Jun. 3, 2010

(65) Prior Publication Data
US 2010/0313218 A1 Dec. 9, 2010

Related U.S. Application Data

(60) Provisional application No. 61/183,928, filed on Jun. 3, 2009.

(51) Int. Cl.
*H04N 21/81* (2011.01)
*G06Q 30/02* (2012.01)
*H04N 21/2668* (2011.01)

(52) U.S. Cl.
CPC ........... *H04N 21/812* (2013.01); *G06Q 30/02* (2013.01); *G06Q 30/0251* (2013.01); *H04N 21/2668* (2013.01)

(58) Field of Classification Search
CPC ............. H04N 21/812; H04N 21/2668; G06Q 30/0251
USPC ....... 725/22, 32–36; 705/14.41, 14.48, 14.52
See application file for complete search history.

(56) References Cited

U.S. PATENT DOCUMENTS

| 5,155,591 | A | 10/1992 | Wachob | |
|---|---|---|---|---|
| 6,286,005 | B1 | 9/2001 | Cannon | |
| 6,457,010 | B1* | 9/2002 | Eldering | ................ G06Q 30/02 |
| 6,463,585 | B1* | 10/2002 | Hendricks | ........ H04N 21/42684 |
| | | | | 725/35 |
| 6,820,277 | B1* | 11/2004 | Eldering | .......... H04N 21/25891 |
| | | | | 725/35 |
| 7,150,030 | B1* | 12/2006 | Eldering | ................ H04H 60/31 |
| | | | | 725/46 |

(Continued)

FOREIGN PATENT DOCUMENTS

| EP | 1067792 A2 | 10/2001 |
|---|---|---|
| JP | 2001061111 A | 3/2001 |

(Continued)

OTHER PUBLICATIONS

PCT/US2010/037218 International Search Report and Written Opinion of the International Searching Authority dated Aug. 20, 2010.

(Continued)

*Primary Examiner* — Nasser M Goodarzi
*Assistant Examiner* — Patrick A Ryan
(74) *Attorney, Agent, or Firm* — BakerHostetler

(57) ABSTRACT

Systems and procedures which allow for the placement of advertisements in an optimized manner are presented. Systems may be provided which may be configured to optimize a media plan (either automatically or manually, or a combinations of both) using demographic vectors, and may display the optimization results in a quantifiable manner using terms and numbers.

17 Claims, 6 Drawing Sheets

(56) References Cited

U.S. PATENT DOCUMENTS

| | | | |
|---|---|---|---|
| 7,240,355 B1* | 7/2007 | Eldering | H04N 21/2353 348/E5.002 |
| 7,260,823 B2* | 8/2007 | Schlack | G06Q 30/02 725/9 |
| 7,669,212 B2* | 2/2010 | Alao | H04N 7/17309 725/32 |
| 7,949,565 B1* | 5/2011 | Eldering et al. | 705/14.49 |
| 2001/0004733 A1 | 6/2001 | Eldering | |
| 2002/0095676 A1* | 7/2002 | Knee | H04N 21/454 725/46 |
| 2003/0005465 A1 | 1/2003 | Connelly | |
| 2003/0070167 A1* | 4/2003 | Holtz et al. | 725/32 |
| 2003/0101451 A1* | 5/2003 | Bentolila | G06Q 30/0254 725/34 |
| 2003/0131355 A1* | 7/2003 | Berenson | H04N 5/44543 725/46 |
| 2003/0149975 A1 | 8/2003 | Elderling et al. | |
| 2003/0236708 A1 | 12/2003 | Marsh | |
| 2004/0189873 A1* | 9/2004 | Konig | G06K 9/00758 348/607 |
| 2004/0193488 A1 | 9/2004 | Khoo | |
| 2004/0194131 A1* | 9/2004 | Ellis et al. | 725/34 |
| 2004/0243623 A1* | 12/2004 | Ozer et al. | 707/102 |
| 2005/0149398 A1 | 7/2005 | McKay | |
| 2006/0206912 A1* | 9/2006 | Klarfeld | G11B 27/105 725/40 |
| 2007/0027771 A1* | 2/2007 | Collins | G06Q 30/0249 705/14.48 |
| 2007/0157231 A1* | 7/2007 | Eldering et al. | 725/35 |
| 2007/0157245 A1* | 7/2007 | Collins | 725/46 |
| 2007/0162926 A1* | 7/2007 | Steelberg | H04L 63/0428 725/34 |
| 2008/0086750 A1 | 4/2008 | Yasrebi | |
| 2008/0109285 A1* | 5/2008 | Reuther | G06Q 30/02 705/7.11 |
| 2008/0140524 A1* | 6/2008 | Anand | G06Q 30/0269 705/14.66 |
| 2008/0271070 A1* | 10/2008 | Kanojia et al. | 725/32 |
| 2009/0204479 A1* | 8/2009 | Wolinsky | G06Q 30/02 705/14.57 |
| 2010/0145793 A1* | 6/2010 | Cavander | G06Q 10/04 705/14.42 |
| 2010/0313218 A1 | 12/2010 | Niemeijer | |
| 2012/0042339 A1* | 2/2012 | Kitts | H04N 21/25883 725/35 |
| 2012/0150630 A1* | 6/2012 | Hicken | G06Q 30/0249 705/14.48 |

FOREIGN PATENT DOCUMENTS

| | | |
|---|---|---|
| JP | 2002516536 A | 6/2002 |
| JP | 2004-171151 | 6/2004 |
| JP | 2005-518110 A | 6/2005 |
| JP | 2007-515018 | 6/2007 |
| JP | 2008011544 A | 1/2008 |
| JP | 2008-546355 | 12/2008 |
| JP | 2009-088777 | 4/2009 |
| JP | 2009-110436 A | 5/2009 |
| JP | 2012-529240 | 11/2012 |
| WO | 9960789 A1 | 11/1999 |
| WO | 0033228 A1 | 6/2000 |
| WO | 0064165 A1 | 10/2000 |
| WO | WO 2002/103940 A2 | 12/2002 |
| WO | WO 2006/133364 A2 | 12/2006 |
| WO | 2008020952 A1 | 2/2008 |

OTHER PUBLICATIONS

European Patent Application 10784076.1, Extended European Search Report, dated May 14, 2014.

* cited by examiner

TARGETING TELEVISION ADVERTISEMENTS BASED ON AUTOMATIC OPTIMIZATION OF DEMOGRAPHIC INFORMATION

CROSS-REFERENCE TO RELATED APPLICATIONS

This application claims the benefit of U.S. Provisional Patent Ser. No. 61/183,928 filed Jun. 3, 2009, the entire disclosure of which is incorporated by reference herein.

FIELD OF INVENTION

The invention generally relates to video processing, and more specifically to optimization of the placement of advertisements in video programming.

BACKGROUND

Purchasers of advertising space, for example television advertisements, typically place advertisements according to a media plan. Media buyers attempt to place advertisements based on fairly broad demographics, such as gender, age, employment, income or other definable group. They develop media plans to place their commercials in TV inventory to reach a certain (preferably high) portion of their target demographics.

A media buyer may have one or more products or brands, with associated target demographics, as well as a set of goals for this specific campaign/plan. Goals are typically expressed as a combination of budget ($ cost) and a certain reach. The buyer then will try to meet, or get as close as possible to, the reach goal while attempting to stay within budget. The buyer will look at ratings data, inventory pricing, and rotations, and will try to come up with the optimal allocation of inventory against the goals. Buyers may perform this process for a single product with a single spot, or for a single product with multiple spots (with different target demo audiences for example), or for multiple products (each with one or more spots), or even for multiple advertisers (with one or more spots each). Such buyers may buy large footprints (for example national, or regional distribution) and may not be able to differentiate within the footprint (the only way to fine-tune multiple spots to target demographics may be through managing rotations).

What is needed, therefore, is a system and method to allow for optimized targeting of advertisements in order to produce and demonstrate a better yield.

SUMMARY

Embodiments of the present invention may provide for systems and procedures which allow for the placement of advertisements in an optimized manner. In some examples, systems are provided which may be configured to optimize a media plan (either automatically or manually, or a combination of both), and may display the optimization results in a quantifiable manner using terms and numbers.

According to one embodiment of the invention, a computer-implemented method for optimizing targeted media is presented. A processor defines a universe, including a plurality of media targets, for delivering media content on a network. For each media target, the processor defines at least one demographic vector, where each demographic vector contains a plurality of indices and each index represents an attribute score. The demographic vector is stored in a memory device and the processor optimizes a rotation of media content to the universe by determining the appropriate placement of the media content in each of the media targets based on the attribute scores in the demographic vector.

According to another embodiment of the system, a computer program product including a computer usable medium having control logic stored therein causes the computer to optimize the targeting of media. The control logic includes a first computer readable program code means for causing the computer to define a universe for delivering media content on a network, where the universe contains a plurality of media targets. A second computer readable program code means causes the computer to, for each media target, define at least one demographic vector, each demographic vector having a plurality of indices and each index represents an attribute score. A third computer readable program code means causes the computer to store the demographic vector in a memory device and a fourth computer readable program code means causes the computer to optimize a rotation of media content to the universe by determining the appropriate placement of media content in each of the media targets based on the attribute scores in the demographic vector.

Yet another embodiment of the invention includes a computer-implemented method for optimizing targeted media. The computer includes a processor, a memory device and control logic stored therein. The processor defines a universe for delivering media content on a network, where the universe contains a plurality of media targets. For each media target, the processor defines at least one demographic vector, each demographic vector including a plurality of indices and each index represents an attribute score. The demographic vector is stored in the memory device and the processor optimizes a rotation of media content to the universe by determining the appropriate placement of media content in each of the media targets based on the attribute scores in the demographic vector. The control logic defines a goal, defined by a parameter to be accomplished by delivery of the media content and optimizes the rotation of media content subject to the parameter of the goal. An indicator representing the effectiveness of the rotation in accomplishing the goal is displayed to a user through an interface.

BRIEF DESCRIPTION OF THE DRAWINGS

The present invention will be more readily understood from a detailed description of the preferred embodiments taken in conjunction with the following figures.

DETAILED DESCRIPTION

Figure 1:
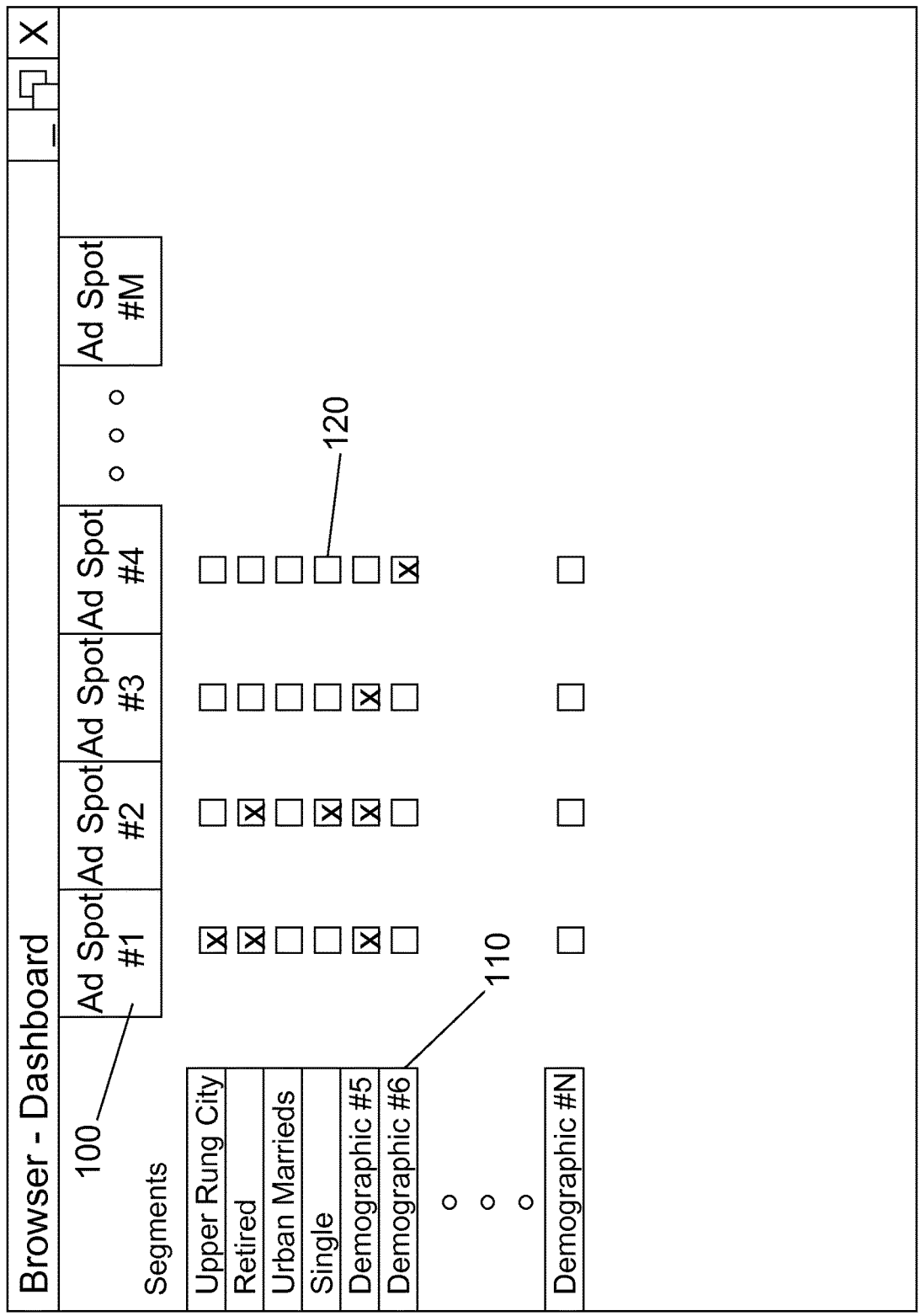
FIG. 1 illustrates an example interface screen in accordance with an example embodiment of the present invention.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise. As used herein, the term "about" refers to a ±10% variation from the nominal value.

It should be understood that the order of steps or order for performing certain actions is immaterial so long as the present teachings remain operable. Moreover, two or more steps or actions may be conducted simultaneously.

Example embodiments of the present invention provide systems and methods which may optimize the placement of advertisements in television programming. It is noted that the embodiments described below make reference to television systems, and television commercials and advertisements. It is to be understood that the present invention is not limited to such embodiments however, and that other embodiments relate to other media types, such as radio, streaming video or any other media distribution system, as well as to the insertion of other kinds of messages.

Embodiments of the present invention may provide systems which optimize the placement of advertising. Such a system may be configured to place media within a universe of inventory. That universe may be made up of a set of physical targets ($T_i$). For instance, the universe could be a national cable network or other definable network of media content recipients. Physical targets, for example, may be individual digital cable subscribing homes, individual set-top boxes or other end-points of a media transmission. Targets could also include ad-insertion zones, physical regions, programs, periods of the day, real-time conditionals, or any other definable.

Embodiments of the invention may also be configured with demographic information relating to each of the physical targets. Such information may be stored in any convenient form such as a database, table, or other suitable memory structure on a storage device. As an example, a system may store a set of detailed demographic vectors (S) for each individual physical target (T), where each demographic vector ($S_i$) represents a specific population segment. The population segments, may include, for example and without limitation, income level, gender, number of residents in a household, age ranges, employment, education levels, real-time conditionals (such as weather, news, stock markets) or any other definable demographic. According to one embodiment demographic vector data may be obtained in real-time from third-party sources such as wire services, news outlets, Internet sites, web pages, or other service providers.

In an illustrative demographic vector, each index represents a specific value, or attribute score, within the segment (for example income ranges such as: "less-than $40 k", "$40 k-$60 k", "$60 k-$80 k", "$80 k-$100 k", "greater-than $100 k"). The values of the attribute score within the vector represent how the associated target (T) scores against these segment values. For example, an ad-insertion zone could have a vector for the "family size" segment that is represented as follows:

$$S_{0801, Family\_Size} \begin{pmatrix} single\_no\_kids \\ single\_with\_kids \\ couple\_no\_kids \\ couple\_with\_kids \end{pmatrix} = \begin{pmatrix} 301 \\ 12 \\ 178 \\ 739 \end{pmatrix} \quad (1)$$

The above example vector would indicate that the particular zone has a relatively high density of couples with children, and a very low density of single parents with kids (the values in the example are indexed between 0 and 1000). In another example, a physical target may represent a particular household, and may be associated with a vector indicating the propensity to purchase a particular type of automobile:

$$S_{X, Propensity\_Car} \begin{pmatrix} sedan \\ sports \\ minivan \\ SUV \\ truck \end{pmatrix} = \begin{pmatrix} 221 \\ 98 \\ 897 \\ 556 \\ 131 \end{pmatrix} \quad (2)$$

Such a vector would indicate that the household is likely to buy a minivan or an SUV with a much smaller likelihood of purchasing a sports car or truck. Again, the values in this embodiment may be indexed, between 0 and 1000).

Example systems may provide and store any number of such vectors associated with the physical targets stored. Each physical target may be associated with any number of demographic vectors. In example embodiments, each vector may have a defined set of indices, and a defined range of values. The values need not necessarily be normalized. For example, some example demographic vectors may comprise binary values. The following example shows a vector for household X indicating the number of children in the household:

$$S_{X, Nr\_of\_Kids} \begin{pmatrix} none \\ one \\ two \\ three \\ four+ \end{pmatrix} = \begin{pmatrix} 0 \\ 0 \\ 1 \\ 0 \\ 0 \end{pmatrix} \quad (3)$$

According to this vector, household X has two (2) children. As the example illustrates, there may be restrictions to the values a vector may take. In this embodiment, because the household cannot have two discrete numbers representing the number of children in the household, only one value can be 1, while the others must be 0; therefore all values always add up to 1. Example systems may define and store any such restrictions on particular vector definitions.

Thus embodiments of the system may be configured with a physical universe (U) that comprises a number of physical targets (T):

$$U = \sum_i T_i \qquad (4)$$

Where every target $T_i$ is defined by a defined set of vectors (S):

$$T_i = \sum_j S_{i,j} \qquad (5)$$

Where each vector (S) defines scores against segmentation values:

$$S_{i,j} = \begin{pmatrix} x_1 \\ x_2 \\ x_3 \\ \dots \\ x_n \end{pmatrix} \qquad (6)$$

Each of the demographic vectors may be summed, multiplied or optimized any another manner to determine the most effective media content for each individual defined target. The rotations of media content distributed over the universe may then be customized, by target, to generate the most effective results.

Embodiments of the system may also provide for the configuration of a media plan or campaign. For example, a media plan which may cover multiple brands, or products, each of which may have a distinct target demographic, budgets, and reach goals. "Reach" as used herein, refers to the number, or percentage, of the target demographic group that will be exposed to the media plan. Each brand may have a set of target demographics associated with it. Example systems may allow advertisers to enter and store such demographics. Such target demographics may be more detailed than the typical television buying demographic. For example a target demographic may be defined as "males 18-25" instead of the more generic "males 18-45," which is a typical demographic used in the television industry.

In addition systems may allow for the configuration of a set of goals. Goals can be set in terms of many parameters including, but not limited to, budget per product/brand, desired reach, flight ("flight" as used herein refers to the dates when the media plan is scheduled to be on-air), frequency ("frequency" as used herein refers to the average number of times a person is exposed to the media plan), or a frequency cap, which imposes an upper bound on the frequency.

Other example parameters by which a media plan may be defined may include Cost-Per-Mille (CPM) which expresses the cost of reaching absolute numbers of viewers. The CPM, according to one embodiment, is the cost to reach 1000 people. Similarly, the Targeted CPM (TCPM) may also be used which is the cost to reach 1000 people in the target demo. It is calculated, according to one embodiment, as TCPM=CPM/"fraction," where "fraction" represents the fraction of the total universe that is actually in the target demo. Therefore, if the CPM for a particular media plan is $50 and half of the viewers are male (fraction=0.5), then the TCPM would be $100 (=$50/0.5).

Other goal parameters may be defined in terms of rating points. A rating point refers to one percentage point of the target demographic. For example, if a media plan is targeted at males, and it consists of 10 insertions into programs that each have a rating of 5 for males (meaning that an average of 5% of the male population will watch these programs), then this plan would deliver 50 (=10×5) Gross Rating Points (GRPs), which may be used as a goal parameter in some embodiments. Another parameter which may be used is Cost-Per-Point (CPP) which refers to the cost to deliver one rating point. So if the example media plan would cost $10,000 then the Cost-Per-Point (CPP) would be $200 (=$10,000/50). Ratings are dependent on programs and parts of the day, such as Morning News (5:00 am-9:00 am), evening news, primetime, or other definable period. Such parameters are not exhaustive, and any other quantifiable parameters may be used.

Embodiments of the invention may also provide a processor configured to optimize the media plan. For instance, example systems may use the difference in demographic vectors per zone, or other physical target, described above, to calculate the optimal rotation as to that zone, driven by the goals of the media plan. One embodiment of the system may perform optimization automatically, for example, as soon as the targeting screens are initially opened, or when a user selects an "Auto-Optimization" button. In addition, example systems may allow users to manually override and refine the media placement. In both cases, example systems may show (for each spot/product/brand) the Targeted CPM, or other target value, at any given time, providing instant feedback on the value that is being added by the optimization system.

Example systems may optimize placements based on any number of defined goals as described above. For instance, a system may be configured to optimize placement according to reach or CPM. In addition, example systems may allow for optimization based on multiple parameters at once. For instance, a system may be configured to optimize placement based on reach, but may do so only with a defined budget goal. Thus, the system may attempt to come as close as possible to maximizing reach, while not exceeding the limit set by the budget goal. Any combination of parameters may be used to guide optimization, and multiple parameters may be combined in any logical manner according to any reasonable formula or set of priorities.

In one example system the targeting universe may be divided into zones, and there may be a defined, fixed set of vectors per zone (definitions and data are pre-loaded in tables and are not configurable). In addition, the system may be configured with a fixed media plan (again pre-loaded and not configurable). All data may be aggregated data at the zone level. The system may allow users to configure multiple advertisers with one spot each, or one advertiser with multiple products/brands with one spot per product/brand. In addition, the optimization goals may be configured in terms of budgets per client/product as well as reach. Thus the system may maximize reach (i.e., come as close as possible to all goals) against fixed budgets.

Illustrative embodiments may also provide user interfaces which allow users to configure the system for various spots/products/brands. For instance, FIG. 1 illustrates an interface which may be provided by an example system allowing users to associate spots with particular demographic groups. The interface displays the spots which have been defined 100 and also displays a number of target demographic groups 110 with which the spots may be associated. Note that the demographic groups may be represented by labels which may be more specifically defined (e.g., income less-than $50,000, etc.). In addition, the interface may allow a user to build associations between the spots and target demographics by checking a box 120.

Figure 2:
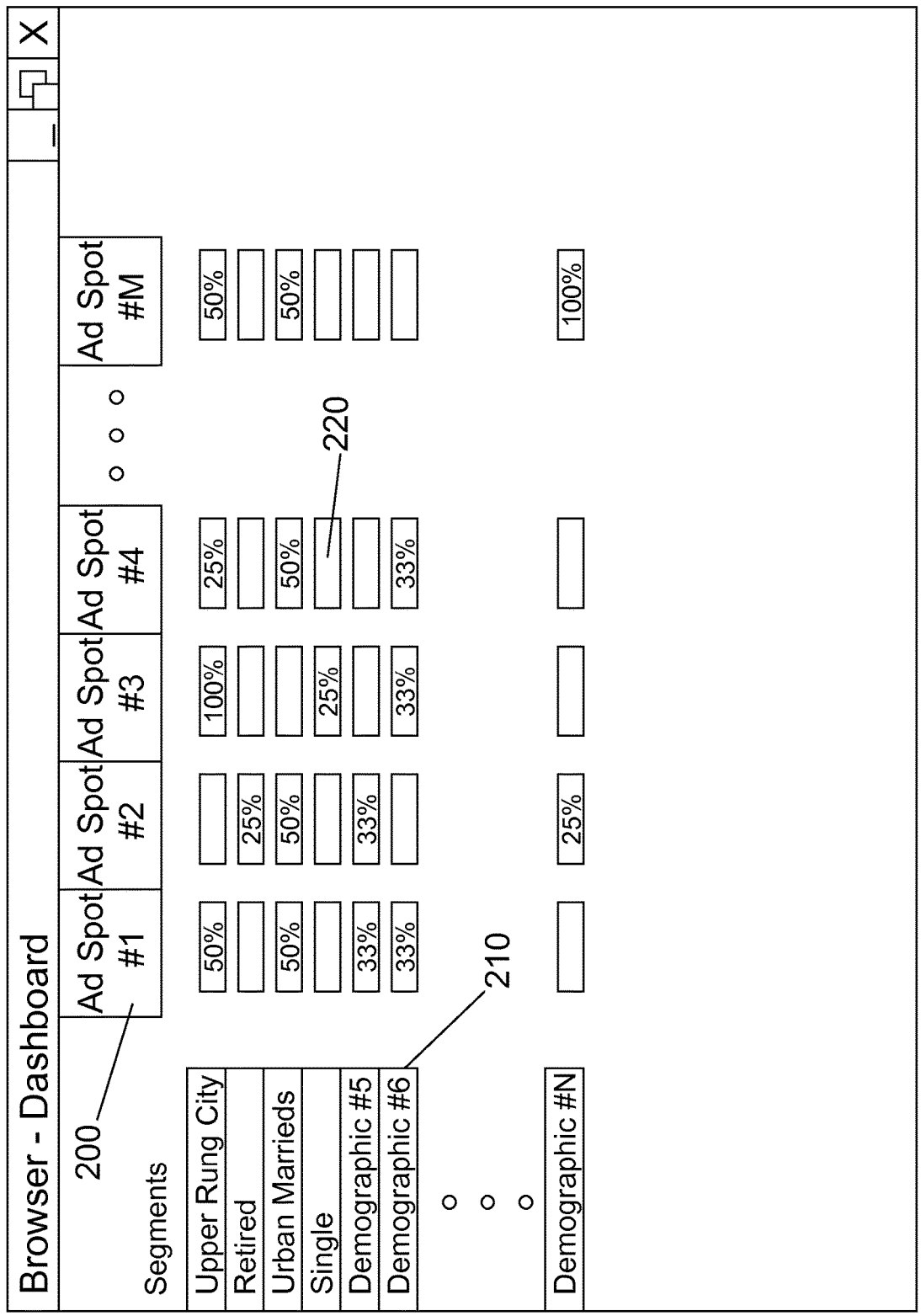
FIG. 2 illustrates an example interface screen in accordance with an example embodiment of the present invention.

FIG. 2 illustrates another example screen from an interface. The screen displays information allowing a user to see the current rotation as to each demographic. For instance, the screen again shows advertisement spots 200, and demographic groups 210. Here, however, the interface provides percentages illustrating how each spot is placed within the demographic group 220. For instance, two spots target the "Urban Marrieds" group equally in the example.

Figure 3:
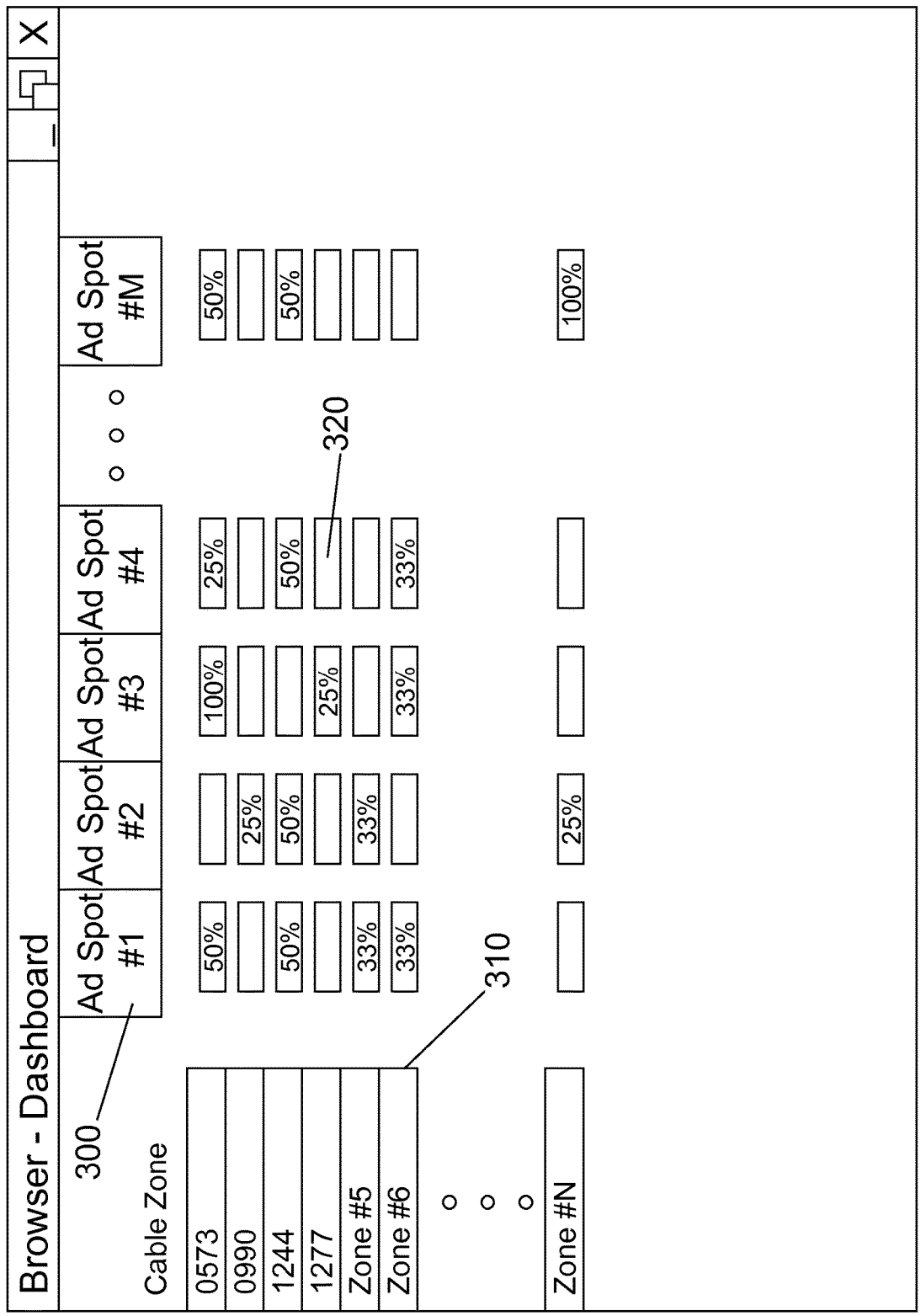
FIG. 3 illustrates an example interface screen in accordance with an example embodiment of the present invention.

FIG. 3 shows another example interface screen. FIG. 3 again illustrates a number of spots 300. Here, however, the spots are shown divided over physical zones to which the advertisements themselves are targeted 310. For instance, the example screen shows the zones in a Chicago cable network 310. The exemplary screen illustrates how spots are targeted within each zone 320. For instance, as seen in the first row of the interface screen, three spots are targeting zone number 0573.

Figure 4:
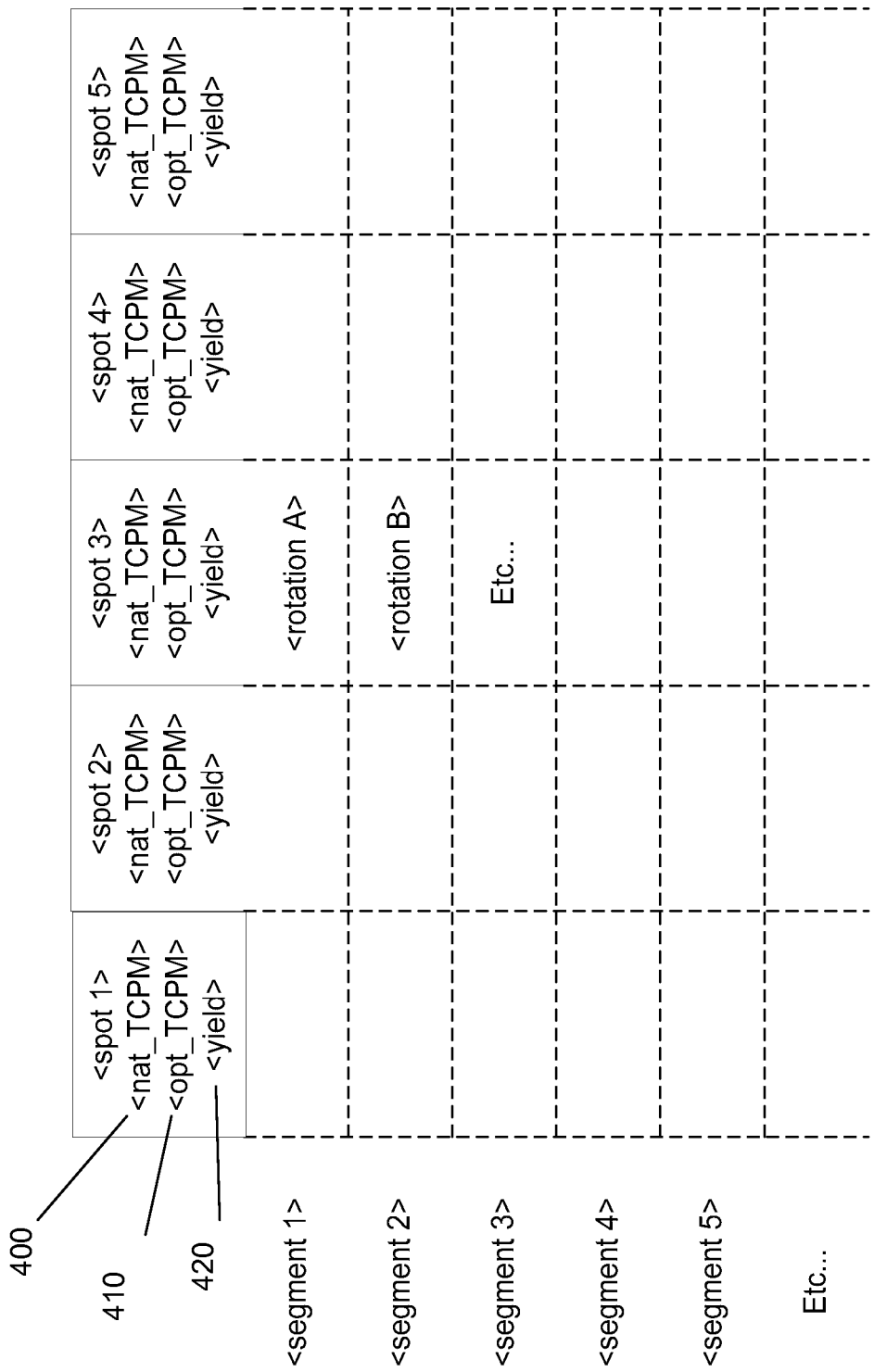
FIG. 4 illustrates an example interface screen in accordance with an example embodiment of the present invention.

Such a system may also include an interface which may display information indicating the effects of the optimization. For example, the interface may show Targeted CPMs, which may be calculated by the system. FIG. 4 illustrates an embodiment of a conceptual interface screen, similar to the other example screens of FIGS. 1-3, with three additional fields for each spot. The system may dynamically compute the fields and update them after every change. The screen in FIG. 4 illustrates providing <nat_TCPM> 400, which refers to the Targeted CPM that can be accomplished for each spot in a certain media-buy based on an optimal national rotation. The example screen also provides a <opt_TCPM> field 410, which refers to the optimized Targeted CPM that can be accomplished when the rotations are optimized on the individual zones or syscodes. Typically, opt_TCPM is greater than nat_TCPM. In a worst case scenario, running the national rotation in every zone/syscode would result in the national TCPM being exactly the same as the individual zone TCPM). The example screen also provides a <yield> field 420, which refers to the percentage increase/decrease between <opt_TCPM> and <nat_TCPM>, according to one embodiment. If <opt_TCPM> is smaller than <nat_TCPM> this number should be positive (and may be shown in green to reflect a positive comparison). If <opt_TCPM> is bigger than <nat_TCPM> then this number should be negative (and may be shown in red).

Figure 5:
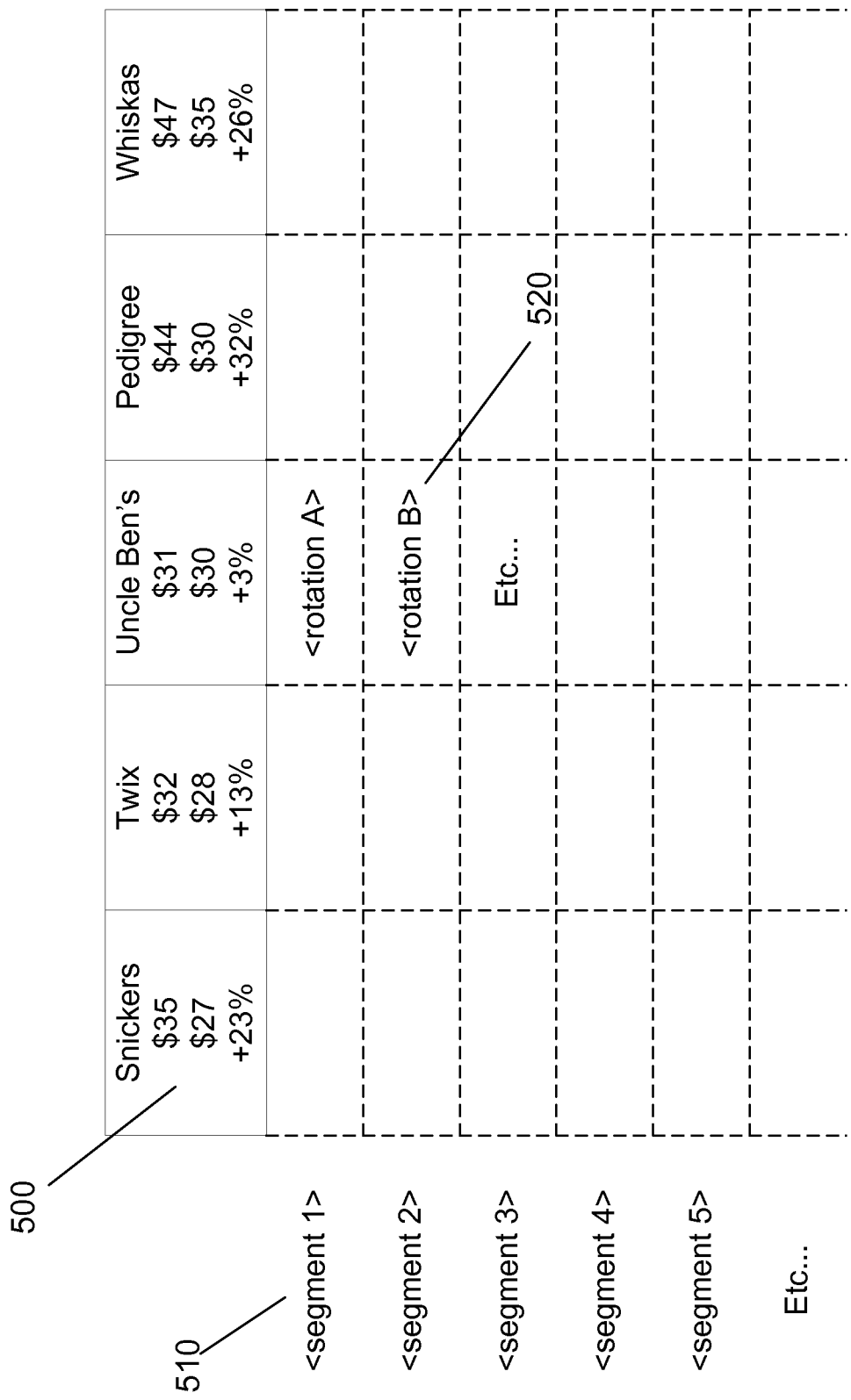
FIG. 5 illustrates an example interface screen in accordance with an example embodiment of the present invention.

FIG. 5 illustrates one embodiment of the invention using such an interface. In FIG. 5, the screen displays a set of products 500 (Snickers, Twix, Uncle Ben's, Pedigree and Whiskas) and a set of demographic segments 510 (segment 1-segment 5). The screen shows the current rotation for each segment 520, determined by the system using an optimization process described above. In addition, for each product, the screen shows the additional fields discussed above. For instance, for the Snickers product, the screen shows the national TCPM as $35 and the optimized TCPM at $27 for a yield of +23%.

Other embodiments of systems may be configured differently as different media buyers may work in different ways. For instance, some buyers may aggregate the CPM over all brands and inventory, so that everybody pays the same flat fee, in which case the system may be configured to show GRPs instead of TCPMs. Systems may be configured with a list of indicators to choose from, for example, National Targeted CPM (TCPM in case of a nationally executed plan), Optimized Targeted CPM (TCP in case of a locally executed/optimized plan), National GRP (GRP in case of a nationally executed plan), Optimized GRP (GRP in case of a locally executed/executed plan), yield, or other quantifiable metrics. Depending on the products and buyers involved, the system may be configured to display different indicators.

Figure 6:
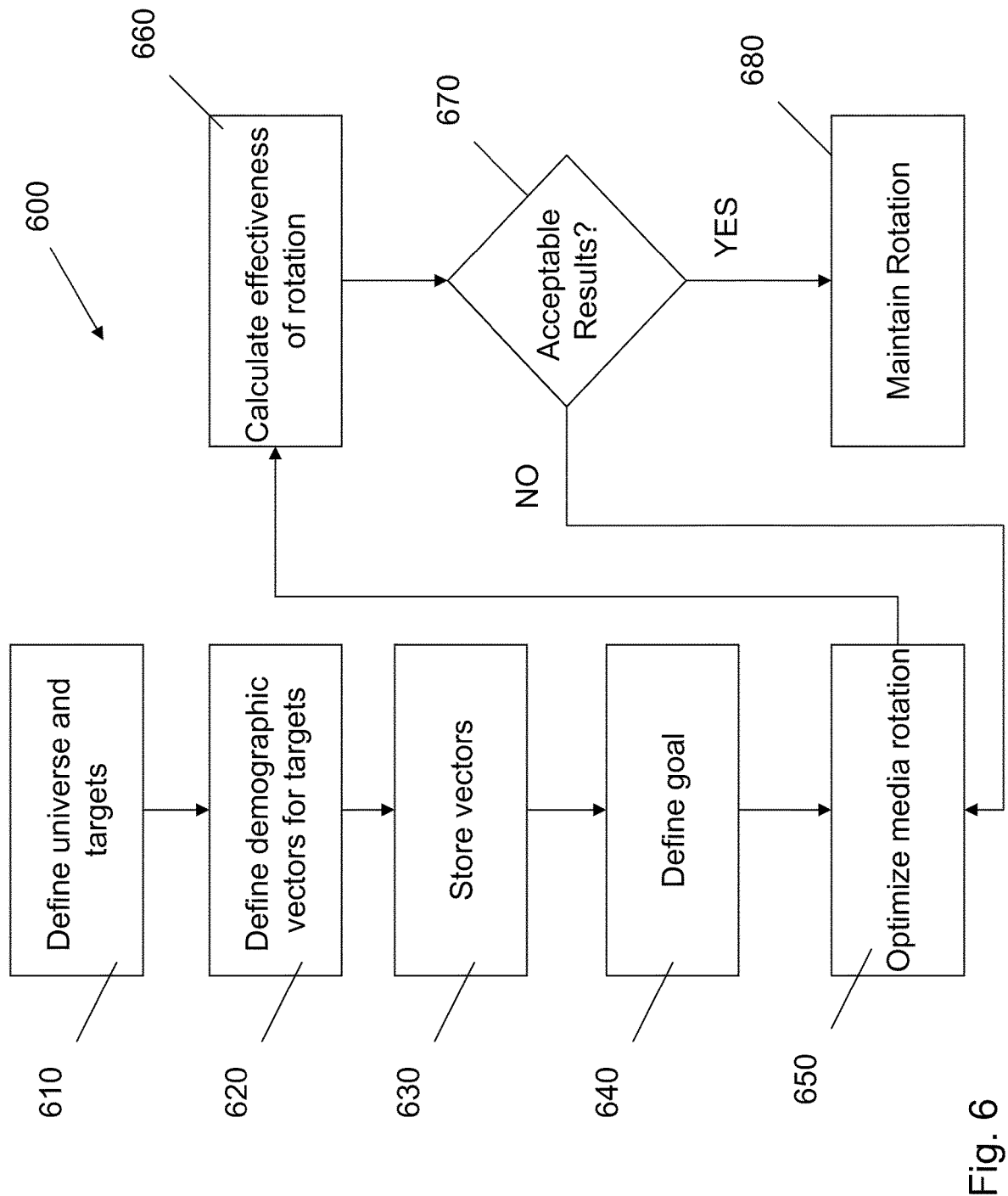
FIG. 6 depicts some of the steps of a method of optimization in accordance with an embodiment of the invention.

Turning now to FIG. 6, a method of optimizing distribution of targeted media rotations 600 is depicted. According to one embodiment, a universe is defined 610, the universe made up of media targets. For each media target, demographic vectors are defined 620, as described above. These demographic vectors are then stored 630. According to one embodiment, a goal may be defined 640 reflecting the success of the targeted media distribution. The system may optimize the rotation of targeted media 650 content based on the demographic vectors or the goal of the targeted rotation. The effectiveness of the rotation is then calculated 660. If the effectiveness of the rotation meets or exceeds the goal 670, the rotation may be kept in place. If the results of the rotation are unacceptable, the rotation may be re-optimized 650 to provide better results and the effectiveness may be re-calculated 660.

The present invention may be embodied in may different forms, including, but in no way limited to, computer program logic for use with a processor (e.g., a microprocessor, microcontroller, digital signal processor, or general purpose computer), programmable logic for use with a programmable logic device, (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

It will further be appreciated that the above-described methods and procedures may be provided using the systems disclosed herein, or on other types of systems. The methods and procedures, unless expressly limited, are not intended to be read to require particular actors or systems performing particular elements of the methods.

In the preceding specification, the present invention has been described with reference to specific example embodiments thereof. It will, however, be evident that various modifications and changes may be made thereunto without departing from the broader spirit and scope of the present invention. The description and drawings are accordingly to be regarded in an illustrative rather than restrictive sense.

What is claimed is:

1. A method comprising:
   receiving first information comprising demographic data associated with a plurality of zones;
   determining, based on the demographic data, a plurality of demographic vectors associated with a plurality of population segments within the plurality of zones;
   determining, based on the plurality of demographic vectors and based on a targeted reach for first media content, a first rotation of the first media content within the plurality of zones;
   causing, via a user interface, display of second information associated with placement of the first media content during the first rotation, wherein the user interface comprises at least a national targeted cost-per-mille (CPM) field and an optimized CPM field, and wherein the second information indicates a yield percentage increase or decrease for the national targeted CPM field and the optimized CPM field; and
   determining, based on the second information, a second rotation of second media content.

2. The method of claim 1, wherein the first rotation is further determined based on budget, flight, frequency, frequency cap, cost-per-mille, targeted cost per-mille, gross rating points, or cost-per-point.

3. The method of claim 1, wherein the first information is received from one or more web content sources, wherein the one or more web content sources is associated with at least one of a wire service, media service, news outlet, or website.

4. The method of claim 1, wherein each demographic vector of the plurality of demographic vectors comprises a plurality of indices, wherein each index of the plurality of indices is associated with an attribute score within the population segment, and wherein the attribute score comprises at least one of a binary value or is indexed between 0 and 1000.

5. A device comprising:
   one or more processors; and
   memory storing instructions that, when executed by the one or more processors, cause the device to:
      receive first information comprising demographic data associated with a plurality of zones;
      determine, based on the demographic data, a plurality of demographic vectors associated with a plurality of population segments within the plurality of zones;
      determine, based on the plurality of demographic vectors and based on a targeted reach for first media content, a first rotation of the first media content within the plurality of zones;
      cause, via a user interface, display of second information associated with placement of the first media content during the first rotation, wherein the user interface comprises at least a national targeted cost-per-mille (CPM) field and an optimized CPM field, and wherein the second information indicates a yield percentage increase or decrease for the national targeted CPM field and the optimized CPM field; and
      determine, based on the second information, a second rotation of second media content.

6. The device of claim 5, wherein the first rotation is further determined based on budget, flight, frequency, frequency cap, cost-per-mille, targeted cost-per-mille, gross rating points, or cost-per-point.

7. The device of claim 5, wherein the first information is received from one or more web content sources, wherein the one or more web content sources is associated with at least one of a wire service, media service, news outlet, or website.

8. The device of claim 5, wherein each demographic vector of the plurality of demographic vectors comprises a plurality of indices, wherein each index of the plurality of indices is associated with an attribute score within the population segment, and wherein the attribute score comprises at least one of a binary value or is indexed between 0 and 1000.

9. A non-transitory computer-readable storage medium storing computer-readable instructions that, when executed by a processor of a computing device, cause the computing device to perform operations comprising:
   receiving first information comprising demographic data associated with a plurality of zones;

determining, based on the demographic data, a plurality of demographic vectors associated with a plurality of population segments within the plurality of zones;

determining, based on the plurality of demographic vectors and based on a targeted reach for first media content, a first rotation of the first media content within the plurality of zones;

causing, via a user interface, display of second information associated with placement of the first media content during the first rotation, wherein the user interface comprises at least a national targeted cost-per-mille (CPM) field and an optimized CPM field, and wherein the second information indicates a yield percentage increase or decrease for the national targeted CPM field and the optimized CPM field; and determining, based on the second, a second rotation of second media content.

10. The non-transitory computer-readable storage medium of claim 9, wherein the first rotation is further determined based on budget, flight, frequency, frequency cap, cost-per-mille, targeted cost-per-mille, gross rating points, or cost-per-point.

11. The non-transitory computer-readable storage medium of claim 9, wherein the first information is received from one or more web content sources, wherein the one or more web content sources is associated at least one of with a wire service, media service, news outlet, or website.

12. The non-transitory computer-readable storage medium of claim 9, wherein each demographic vector of the plurality of demographic vectors comprises a plurality of indices, wherein each index of the plurality of indices is associated with an attribute score within the population segment, and wherein the attribute score comprises at least one of a binary value or is indexed between 0 and 1000.

13. The method of claim 1, wherein the determining the second rotation is in response to at least one of: the yield percentage increase or decrease for the national targeted CPM field or the optimized CPM field being below a threshold.

14. The method of claim 1, wherein the determining, based on the plurality of demographic vectors and based on a targeted reach for first media content, the first rotation comprises:
   determining, for each zone of the plurality of zones, a difference between each demographic vector of the plurality of demographic vectors.

15. The device of claim 5, wherein the determining the second rotation is in response to at least one of: the yield percentage increase or decrease for the national targeted CPM field or the optimized CPM field being below a threshold.

16. The device of claim 5, wherein the determining, based on the plurality of demographic vectors and based on a targeted reach for first media content, the first rotation comprises:
   determining, for each zone of the plurality of zones, a difference between each demographic vector of the plurality of demographic vectors.

17. The non-transitory computer-readable storage medium of claim 9, wherein the determining the second rotation is in response to at least one of: the yield percentage increase or decrease for the national targeted CPM field or the optimized CPM field being below a threshold.

* * * * *